(12) United States Patent
Sharma et al.

(10) Patent No.: US 10,701,163 B2
(45) Date of Patent: Jun. 30, 2020

(54) LINES PREDICTION MODEL

(71) Applicant: Visa International Service Association, San Francisco, CA (US)

(72) Inventors: Varun Sharma, Foster City, CA (US); Patrick Egbuchulam, Foster City, CA (US); Zian Huang, Foster City, CA (US); Nandakumar Kandaloo, Foster City, CA (US); Srijoy Aditya, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 603 days.

(21) Appl. No.: 15/382,495

(22) Filed: Dec. 16, 2016

(65) Prior Publication Data
US 2018/0176311 A1    Jun. 21, 2018

(51) Int. Cl.
*H04L 29/08* (2006.01)

(52) U.S. Cl.
CPC .............. *H04L 67/22* (2013.01); *H04L 67/18* (2013.01)

(58) Field of Classification Search
CPC ........ H04L 67/22; H04L 67/18; H04L 67/306
See application file for complete search history.

(56) References Cited

U.S. PATENT DOCUMENTS

| 6,330,326 | B1 | 12/2001 | Whitt |
| 6,829,583 | B1 | 12/2004 | Knapp et al. |
| 6,842,719 | B1 | 1/2005 | Fitzpatrick et al. |
| 7,778,937 | B2 | 8/2010 | Ferrara et al. |
| 8,712,822 | B2 | 4/2014 | Sharma et al. |
| 8,768,867 | B1 | 7/2014 | Thaeler et al. |
| 8,788,337 | B2* | 7/2014 | LeBlanc ............ G06Q 30/0255 705/14.41 |
| 9,113,309 | B2 | 8/2015 | Uilecan et al. |
| 9,792,578 | B2* | 10/2017 | Dornbush ............ G06Q 10/087 |
| 2002/0107720 | A1 | 8/2002 | Martin |
| 2007/0244741 | A1* | 10/2007 | Blume .................... G06Q 30/02 705/7.31 |
| 2009/0281817 | A1* | 11/2009 | Ferrara ................. G06Q 10/06 705/1.1 |
| 2010/0306029 | A1* | 12/2010 | Jolley .................... G06Q 30/02 705/7.29 |

(Continued)

*Primary Examiner* — Moustafa M Meky
*Assistant Examiner* — Kidest Mendaye
(74) *Attorney, Agent, or Firm* — Kilpatrick Townsend & Stockton LLP

(57) ABSTRACT

Described herein is a system and method for estimating wait times at various resource providers based on transaction information submitted to a processing network. In some embodiments, the system identifies a time distance between a target resource provider and a plurality of other resource providers in order to identify resource providers local to the target resource provider. Additionally, the system may identify segments for each of a plurality of users on the system. The processing network may identify recent transaction requests received from each of the resource providers local to the target resource provider. The processing network may then identify users associated with each of those transaction requests. Based on the segments assigned to each of those users, the system may estimate and arrival rate, and subsequently an estimated wait time, for the target resource provider.

11 Claims, 9 Drawing Sheets

(56) References Cited

U.S. PATENT DOCUMENTS

| | | | |
|---|---|---|---|
| 2011/0313900 A1* | 12/2011 | Falkenborg | G06Q 20/227 |
| | | | 705/30 |
| 2014/0163934 A1 | 6/2014 | Zhang et al. | |
| 2015/0302438 A1* | 10/2015 | Chauhan | G06Q 30/0205 |
| | | | 705/7.34 |
| 2016/0132913 A1* | 5/2016 | Hanjrah | G06Q 30/0204 |
| | | | 705/7.33 |
| 2016/0314482 A1 | 10/2016 | Basu | |

* cited by examiner

TRANSACTION MATRIX 1

| | PROVIDER 1 | PROVIDER 2 | ⋯ | PROVIDER N |
|---|---|---|---|---|
| USER 1 | 0 | 2 | ⋯ | 1 |
| USER 2 | 1 | 0 | ⋯ | 0 |
| ⋮ | ⋮ | ⋮ | ⋮ | ⋮ |
| USER M | 3 | 0 | ⋯ | 1 |

TRANSACTION MATRIX 2

| | PROVIDER 1 | PROVIDER 2 | ⋯ | PROVIDER N |
|---|---|---|---|---|
| USER 1 | 0 | $12.45 | ⋯ | $7.65 |
| USER 2 | $8.23 | 0 | ⋯ | 0 |
| ⋮ | ⋮ | ⋮ | ⋮ | ⋮ |
| USER M | $25.32 | 0 | ⋯ | $9.84 |

FIG. 5

LINES PREDICTION MODEL

BACKGROUND

Wait times associated with various resource providers may influence consumer behavior. For example, wait times can vary between different resource providers at different times and this may influence consumer buying decisions. While resource providers may post their own prediction of wait times, these predictions may be influenced by the knowledge that consumers will leave if the presented wait time is too long. Accordingly, it is difficult for consumers to determine whether the resource provider is being honest about its wait time. Additionally, there is no comprehensive way to predict, in real time, how long a wait time will be for a number of resource providers, which would allow the consumer to make an informed choice of resource providers.

Embodiments of the invention address this and other problems, individually and collectively.

BRIEF SUMMARY

Embodiments of the present invention are directed to systems and methods for predicting resource provider conditions utilizing at least transaction data. This may involve identifying a number of user segments based on transaction similarities between users within each of the segments. In some embodiments, this may be done using clustering techniques (e.g., k-means clustering) to group users according to resource provider transactions. For example, users that tend to shop at similar resource provider groups are placed into the same cluster or segment. The systems and methods may also comprise identifying resource providers local to a target resource provider (a resource provider for which a wait time is to be estimated). In some embodiments, this may be done by analyzing past transactions to identify resource providers at which a single user has conducted transactions that are close in time. When a request is received to estimate a wait time for the target resource provider, the system may identify recent transactions conducted at each of the identified local resource providers (e.g., transactions conducted in the last 30 minutes) and may determine users associated with each of those transactions. The system may then generate a probability distribution associated with the identified users based on their associated user segments. Once this probability distribution has been generated, an arrival rate may be estimated for the target resource provider from the probability distribution (e.g., by using a poisson regression). A service rate for the target resource provider may be calculated as a number of transactions recently conducted within a given period of time. The calculated service rate and the estimated arrival rate for the target resource provider may then be used to predict a wait time for the target resource provider.

One embodiment of the invention is directed to a method comprising identifying a plurality of transactions received from a set of resource providers in a vicinity of the target resource provider, determining a plurality of segments associated with the plurality of transactions, and determining, for each transaction in the plurality of transactions based on segments of the plurality of segments associated with that transaction, a probability of a pending transaction at the target resource provider. The method further comprises determining, based on the determined probabilities, a likely total pending transactions at the target resource provider, and calculating, based on the likely total pending transactions at the target resource provider, the queue time for the target resource provider.

Another embodiment of the invention is directed to a server apparatus comprising one or more processors, and a memory including instructions that, when executed by the one or more processors, cause the server apparatus to identify a plurality of transactions received from a set of resource providers in a vicinity of the target resource provider, determine a plurality of segments associated with the plurality of transactions, and determine a probability of a pending transaction at the target resource provider. The instructions further causing the server apparatus to determine, based on the determined probabilities, a likely total pending transactions at the target resource provider, and calculate, based on the likely total pending transactions at the target resource provider, the queue time for the target resource provider.

Yet another embodiment of the invention is directed to a method of predicting a wait time for a target resource provider comprising identifying a plurality of transactions received from a set of resource providers in a vicinity of the target resource provider, identifying users associated with each of the plurality of transactions, determining segments associated with the identified users, and determining, based on the determined segments, a probability distribution for future transactions at the target resource provider. The method further comprising determining, using a poisson regression technique, an expected value of the probability distribution, and calculating, based on the expected value, the wait time for the target resource provider.

These and other embodiments of the invention are described in further detail below.

BRIEF DESCRIPTION OF THE DRAWINGS

FIG. 5 illustrates example transaction matrices that may be implemented in accordance with embodiments of the disclosure;

DETAILED DESCRIPTION

Figure 1:
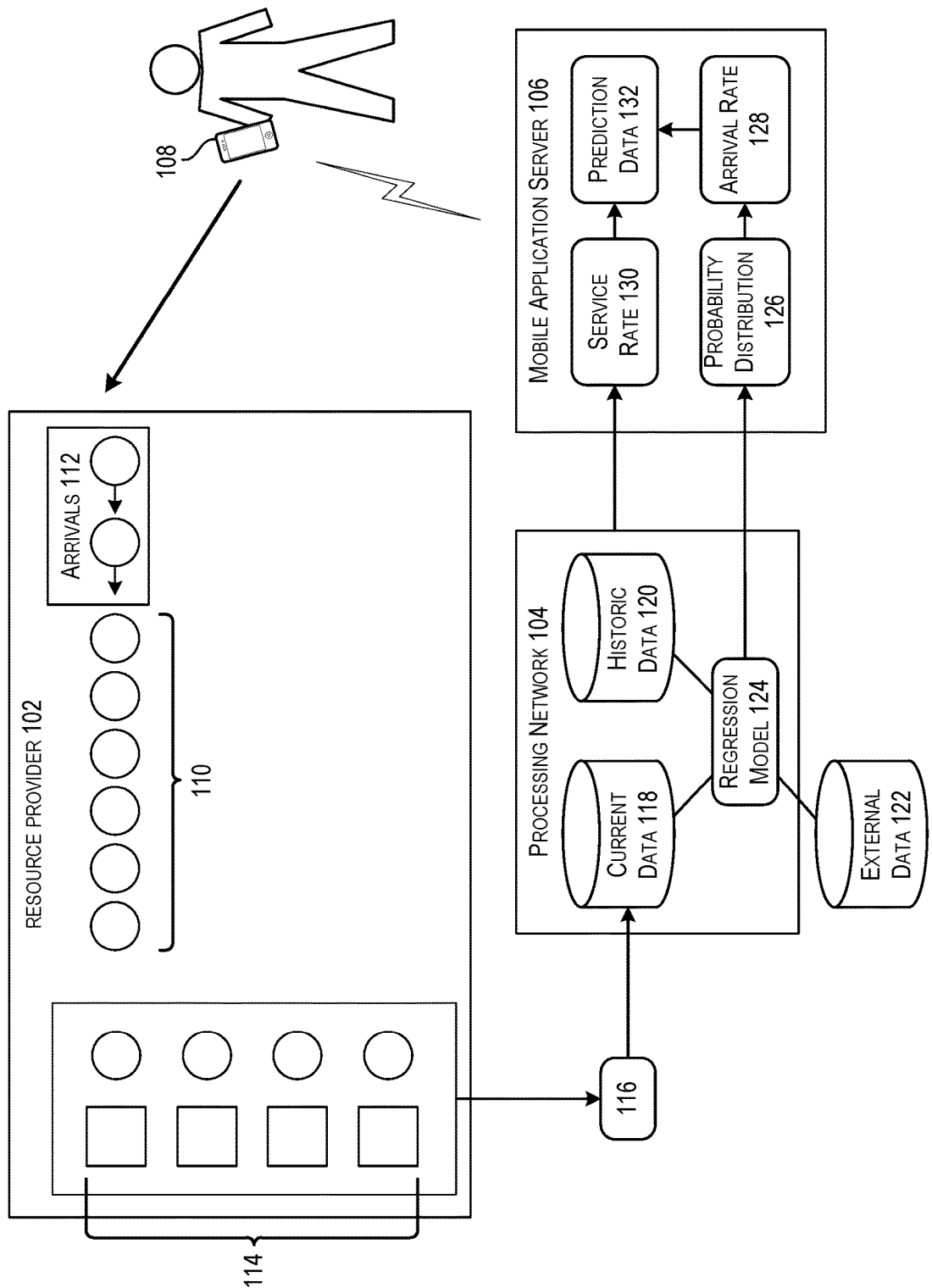
FIG. 1 depicts an illustrative example of a system in which resource provider wait times may be predicted.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing embodiments of the invention, description of some terms may be helpful in understanding embodiments of the invention.

An "arrival rate" may represent a number of users predicted to arrive at a resource provider over a period of time. For example, an arrival rate may be expressed as 5 people/minute. In some embodiments, an arrival rate may represent the likely total pending transactions at a particular resource provider within a given time period. In some embodiments, an arrival rate may be used, in conjunction with a service rate and/or a current wait time, to estimate a future wait time.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction. The code may serve as proof of authorization.

A "mobile application server" may be any computing device configured to provide processing support for a mobile application installed on, and executed from, a mobile device. In some embodiments, a mobile application server may maintain account information associated with a particular mobile device and/or user. In some embodiments, an account maintained on a mobile application server may be accessed via the mobile application installed on a mobile device and/or via an internet connection. In some embodiments, a user may be required to log into an account maintained on a mobile application server. In some embodiments, a mobile device identifier may be associated with the account, such that the account is accessed automatically when the mobile application is executed. In some embodiments, the mobile application server may perform processing functions on behalf of a mobile application installed on a mobile device.

A "mobile device" may include any suitable device that can be easily transported by user. Examples of mobile devices are described in detail below.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "service rate" can be the number of times that a transaction is conducted by a resource provider within a period of time. Service rate may be specific to a particular resource provider. In some embodiments, the service rate may be calculated as a number of authorization requests received for a particular resource provider within the last X seconds, where X is a predetermined amount of time.

A "time distance" may represent an amount of time that it takes to travel between two points. In some embodiments, a time distance may be an amount of time within which it is possible that transactions may be conducted at two separate resource providers by a single user. In some embodiments, a time distance may be determined by assessing various transactions in a transaction database to identify transactions conducted at both resource providers in the past by the same user. In some embodiments, the time distance may comprise the minimum difference in time between these assessed transactions. In some embodiments, the time distance may comprise an average amount of time that usually elapses between transactions conducted at each of the two resource providers. Time distance information may be stored in a resource provider pairing matrix as described in the disclosure. In some embodiments, only transactions occurring within a predetermined time frame may be considered when calculating a time distance. For example, only transactions occurring at each of the resource providers within a two-hour window may be used when calculating time distance between the two resource providers.

A "transaction" may be any interaction or exchange between two or more parties. For example, a transaction may include a first entity requesting resources from a second entity. In this example, the transaction is completed when the resources are either provided to the first entity or the transaction is declined. In some embodiments, a transaction may be associated with transaction data. For example, each transaction may be associated with a resource provider, a user, a currency value, and a time. Transaction information, both historical and real-time, may be stored by a processing network. In some embodiments, transaction information may be communicated via an authorization request message.

A "transaction data" may be any information related to a transaction between two entities. Transaction information may include information related to a completed transaction or a transaction that has not yet been completed. In some embodiments, the transaction information may include any suitable information related to a context of the transaction. For example, the transaction information may include a time at which the transaction was conducted, a terminal at which the transaction was conducted, an amount for which the transaction was conducted, an indication of an entity with whom the transaction was conducted, or any other suitable transaction-related information. Transaction data may include data gathered from authorization requests.

Details of some embodiments of the present invention will now be described.

FIG. 1 depicts an illustrative example of a system in which resource provider wait times may be predicted. In some embodiments, a resource provider 102 may be in communication with a processing network 104. In some embodiments, the processing network 104 may provide information to a mobile application server 106, which provides backend support for a mobile device 108.

In accordance with embodiments of the disclosure, the resource provider 102 may be associated with a current queue length 110 (representing a current quantity of consumers awaiting service at the resource provider), an actual arrival rate 112 (representing new consumers arriving at the resource provider 102), and a number of terminal devices 114 (representing points of sale used to service consumers in the queue).

In accordance with embodiments of the disclosure, the terminals 114 may report a number of transactions 116 to the processing network. In some embodiments, the transactions 116 may be reported via authorization requests related to conducted transactions. For example, each time that a credit card is used to conduct a transaction at one of the terminals 114, the resource provider 102 may request approval from an issuer of the credit card via the processing network 104. In this way, information associated with the transaction 116 may be conveyed to the processing network 104. In some embodiments, data related to the transaction 116 may be stored in current data 118 of the processing network 104.

In accordance with embodiments of the disclosure, the processing network 104 may include any one or a combination of many different types of networks, such as cable networks, the Internet, wireless networks, cellular networks, and other private and/or public networks. In some embodiments, the transaction processing network 104 may comprise at least a process 400 (e.g., VisaNet) configured to route authorization request messages to appropriate authorization entities (e.g., issuers). One or more servers included in the processing network 104 may include processors and computer-executable instructions configured to cause the process 400 104 to perform one or more of the functions described herein. In some embodiments, the processing network server 104 may be configured to assess current data 118 (e.g., data occurring in real-time), historic data 120, and external data 122 in order to generate a regression model 124. In some embodiments, current data 118 may be obtained from recent authorization request messages. Historic data 120 may comprise transaction information obtained in the past from a variety of resource providers. External data 122 may comprise information from a variety of sources. For example, external data 122 may comprise information obtained from a weather database, ratings information related to a resource provider, traffic information, or any other suitable information obtained from an external source.

In accordance with embodiments of the disclosure, a mobile application server may comprise any computing device configured to generate wait time predictions on behalf of a mobile application installed on the mobile device 108. In some embodiments, the mobile application server 106 may be configured to access the regression model 124 on the processing network 104 in order to generate an arrival rate 128 (represented by $\lambda$) which represents a rate at which users are arriving at the resource provider. Additionally, the mobile application server 106 may receive resource provider-specific information from the processing network 104 that allows it to calculate a service rate 130 (represented by $\mu$) that represents a rate at which users are being serviced. The mobile application server 106 may use the service rate 130, the arrival rate 128, and a queue length 110 to determine prediction data 132 (e.g., a current wait time). In some embodiments, the mobile application server 106 may receive feedback from a user of the mobile device 108 as to the actual wait time. In this scenario, the received data may be used to adjust various assumptions used in the regression model 124. For example, the arrival rate 128 may be compared to the actual arrival rate 112 and the regression model 124 may be adjusted so that future probability distributions are more accurate.

A mobile device 108 may be any portable electronic device. In some embodiments, the mobile device 108 may be a computing device, such as a tablet, personal data assistant (PDA), or smart phone. In some embodiments, a mobile device 108 may be a wearable object, such as a smart watch or other clothing or accessory item. In some embodiments, the mobile device may be an onboard vehicle entertainment system. In some embodiments, the mobile device 108 may be capable of communicating with a mobile application server 106 to receive wait time predictions related to resource provider 102.

In accordance with embodiments of the disclosure, a mobile application installed on, and executed by the mobile device 108 may be configured to cause the mobile device to establish communication with the mobile application server 106, receive prediction data 132, and display that prediction data 132 to a user via a graphical user interface (GUI). In some embodiments, the mobile application may be configured to display prediction data 132 for a number of resource providers. In some embodiments, the mobile application may be configured to receive a user's selection of resource provider 102, establish a communication session with mobile application server 106, receive prediction data 132 associated with resource provider 102, and display the received information to the user.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy. In some embodiments of the disclosure, some of the components depicted may be consolidated. For example, the mobile application server 106 may be a part of the processing network 104.

Figure 2:
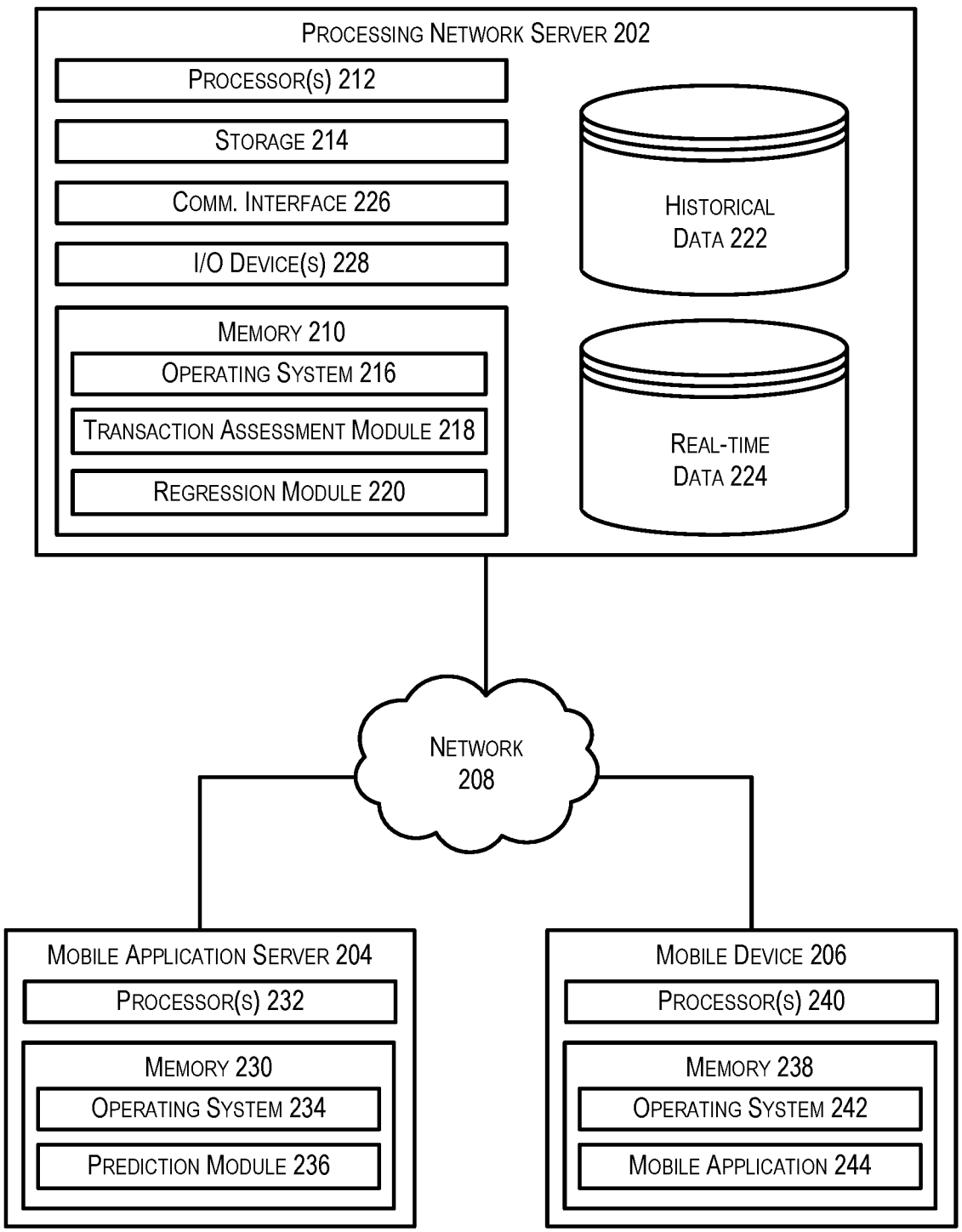
FIG. 2 illustrates an example system architecture that may be implemented to generate wait-time predictions in accordance with embodiments of the disclosure.

FIG. 2 illustrates an example system architecture that may be implemented to generate wait-time predictions in accordance with embodiments of the disclosure. In FIG. 2, a processing network server 202 may be in communication with a mobile application server 204 and/or a mobile device 206. In some embodiments, each of the components may communicate via a network connection 208. In some embodiments, the processing network server 202 may be a processing network server 104 of FIG. 1.

The processing network server 202 may be any type of computing device capable of generating prediction models from transaction data. In at least some embodiments, the processing network 202 may include at least one memory 210 and one or more processing units (or processor(s)) 212. The processor(s) 212 may be implemented as appropriate in hardware, computer-executable instructions, firmware or combinations thereof. Computer-executable instruction or firmware embodiments of the processor(s) 212 may include computer-executable or machine executable instructions written in any suitable programming language to perform the various functions described.

The memory 210 may store program instructions that are loadable and executable on the processor(s) 212, as well as data generated during the execution of these programs. Depending on the configuration and type of processing network 202, the memory 210 may be volatile (such as random access memory (RAM)) and/or non-volatile (such as read-only memory (ROM), flash memory, etc.). The processing network 202 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the processing network 202. In some embodiments, the memory 210 may include multiple different types of memory, such as static random access memory (SRAM), dynamic random access memory (DRAM) or ROM.

Turning to the contents of the memory 210 in more detail, the memory 210 may include an operating system 216 and one or more application programs or services for implementing the features disclosed herein including at least a module for generating user segmentation data (transaction assessment module 218) and/or a module for generating a prediction module (regression module 220). The memory 210 may also include historical data 222, which provides historical transaction data and/or real-time data 224, which provides transaction data occurring in real time.

In some embodiments, the transaction assessment module 218 may, in conjunction with the processor 212, be configured to determine, from transactions occurring at various resource providers, user segments for users associated with the transactions. Various processes that may be performed by the transaction assessment module 218 are described in greater detail below.

In some embodiments, the regression module 220 may, in conjunction with the processor 212, be configured to determine probabilities associated with potential arrival rates. In some embodiments, the probabilities associated with arrival rates may be determined on a resource provider-specific basis. The regression module 220 may utilize any suitable regression technique, including any linear or non-linear regression technique. For example, the regression module 220 may use a poisson regression technique.

The processing network 202 may also contain communications interface(s) 216 that enable the processing network 202 to communicate with a stored database, another computing device or server, one or more remote devices, other application servers, and/or any other suitable electronic devices. In some embodiments, the communication interface 226 may enable the processing network 202 to communicate with other electronic devices on a network (e.g., on a private network). The processing network 202 may also include input/output (I/O) device(s) and/or ports 228, such as for enabling connection with a keyboard, a mouse, a pen, a voice input device, a touch input device, a display, speakers, a printer, etc.

In some embodiments, the mobile application server 204 may include a memory 230 (e.g., a computer-readable storage medium) storing instructions that, when executed by a processor 232 of the mobile application server 204, allow the server to perform its intended functions. Turning to the contents of the memory 230 in more detail, the memory 230 may include an operating system 234 that provides executable program instructions for the general administration and operation of the mobile application server 204, and one or more application programs or services for implementing the features disclosed herein including at least a module for generating resource provider-specific predictions using a regression model (prediction module 236).

In some embodiments, the prediction module 236 may, in conjunction with the processor 232, be configured to determine a wait time associated with a particular resource provider. To do this, the prediction module 236 may use a prediction model generated by the regression module 220. For example, the prediction module 236 may be configured to provide resource provider-specific inputs to a prediction model created by the regression module 220 in order to generate a prediction based on those resource provider-specific inputs.

In some embodiments, the mobile device 206 may comprise any portable electronic device capable of communicating with the mobile application server 204 and/or the network processing server 202. The mobile device 206 may include a memory 238 (e.g., a computer-readable storage medium) storing instructions that, when executed by a processor 240 of the mobile device 206, allow the mobile device to perform its intended functions. Turning to the contents of the memory 238 in more detail, the memory 230 may include an operating system 242 that provides executable program instructions for the general administration and operation of the mobile device 206, and one or more mobile applications 244, at least one of which may be configured to cause the mobile device 206 to communicate with the mobile application server 204 and provide wait time predictions to a user of the mobile device 206.

Figure 3:
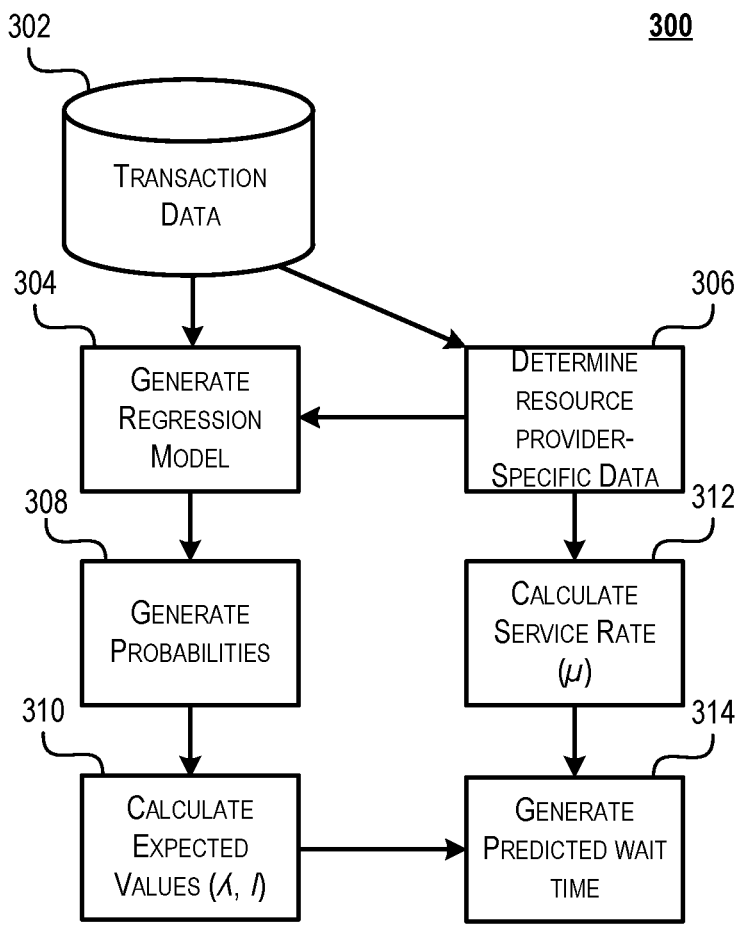
FIG. 3 depicts a process for generating a predicted wait time using transaction data in accordance with embodiments of the disclosure.

FIG. 3 depicts a process for generating a predicted wait time using transaction data in accordance with embodiments of the disclosure. In some embodiments, process 300 may comprise a process for identifying a wait time for a resource provider based on transaction data 302. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more processing network servers 202 depicted in FIG. 2. The code may be stored on a computer-readable storage medium, for example, in the form of a computer program including a plurality of instructions executable by one or more processors. The computer-readable storage medium may be non-transitory.

In process 300, a regression model may be generated at 304 using any suitable regression technique. In some embodiments, the regression model may be generated using machine learning techniques trained on historical transaction data. In some embodiments, the regression model may be used to generate a probability distribution relating to arrival rates ($\lambda$) and/or a current queue length (l). A probability distribution may be any suitable function providing the probability of occurrence of different possible outcomes and may be either discrete or continuous. For example, a probability distribution may comprise a number of probability values and a number of numerical values associated with those probability values. In this example, the probability value may represent the probability that the actual outcome (e.g., the arrival rate or queue length) will be equal to, above, or below (depending on the scenario) the corresponding numerical value. In another example, the probability distribution may be represented by a probability density function. It should be noted that a probability distribution may comprise any suitable indication of outcome probabilities. In some embodiments, the regression model may be trained such that, upon providing one or more input values, a most likely arrival rate is determined from those input values.

Process 300 may identify resource provider-specific data at 306 from the transaction data 302. For example, the processing network server may query transactions that meet certain conditions (i.e., associated with a particular resource provider and/or period of time). The resource provider-specific data may comprise transaction amounts corresponding to transactions conducted by that resource provider, times associated with various transactions conducted by that resource provider, users that have conducted transactions with that resource provider, or any other suitable resource provider-specific data.

At 308, the process 300 may provide at least a portion of the identified resource provider-specific data as inputs to the regression model in order to generate a probability distribution specific to that resource provider. For example, the regression model may be configured to provide a probability distribution as described above. In this example, upon being provided with the resource provider-specific inputs, the regression model may generate numerical values for that resource provider to be associated with the probability distribution. Based on this probability distribution, the process may calculate an arrival rate ($\lambda$) and/or queue length (l) associated with the resource provider at 310. In some embodiments, the value may comprise an expected value determined from the distribution. In some embodiments, a poisson regression may be used to generate an expected value.

By way of illustration, a probability distribution may be generated for arrival rates for a resource provider to comprise P(25)=16, P(50)=14, and P(25)=10, which would indicate that there is a 25% probability that the arrival rate will be 16 people (per the indicated time period), there is an 50% probability that the arrival rate will be 14 people, and there is a 25% probability that the arrival rate will be 10 people. In this example, an expected value for the arrival rate may be calculated as $A_R$=0.25*16+0.50*14+0.25*10=13.5 (or 14 when rounded up).

In some embodiments, the process 300 may determine a service rate ($\mu$) for a resource provider based on the resource provider-specific data at 312. For example, the service rate may be determined as a number of transactions conducted by the resource provider over a period of time (e.g., transactions per minute). In some embodiments, only resource provider-specific data pertaining to recent transactions may be used to calculate the service rate. For example, a current service rate may be calculated using only transaction data from the last five minutes. In some embodiments, the service rate may be updated as new transaction data is received.

Process 300 may generate a wait time for the resource provider at 314. In some embodiments, the wait time may be calculated based on a service rate and an arrival rate. For example, the wait time for a resource provider may be calculated as:

$$\frac{l + t(\lambda - \mu)}{\mu}$$

Where ($\lambda-\mu$) represents the change in wait time ($\lambda$ represents the arrival rate and $\mu$ represents the service rate), l represents a length of the current queue, and t represents a time period over which a prediction is to be made. This function may be used to generate a current predicted wait time. The current predicted wait time may be updated as new information is received. In some embodiments, the system may be configured to receive feedback information from a user that indicates an actual wait time experienced by that user. In that scenario, the system may adjust a current queue length and/or arrival rate information in accordance with the received feedback. In some embodiments, the regression model may be updated based on the received feedback. For example, assumptions used in the generation of the regression model (e.g., values associated with variables) may be updated based on the provided feedback.

Figure 4:
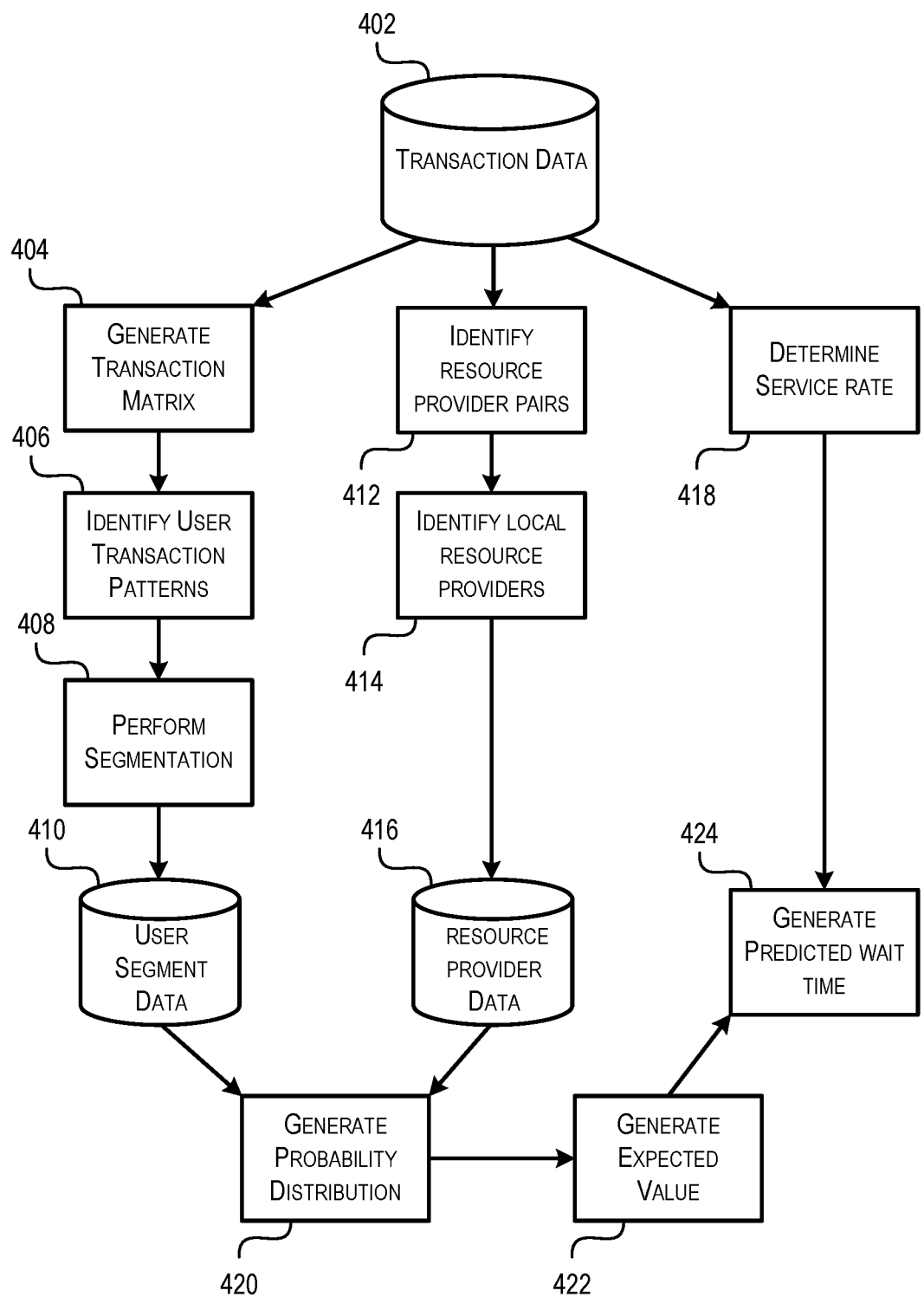
FIG. 4 illustrates an example process for generating predicted wait times in accordance with at least some embodiments.

FIG. 4 illustrates an example process for generating predicted wait times in accordance with at least some embodiments. In FIG. 4, transactions conducted at resource providers (e.g., resource providers) determined to be local to a target resource provider may be used to calculate a predicted wait time for the target resource provider.

In some embodiments, transaction data 402 may be used to generate a transaction matrix at 404. In some embodiments, a transaction matrix may include a record of transactions with respect to users and resource providers. For example, the transaction matrix may include, for each user in a multitude of users, a number of times that a particular user conducted a transaction at each resource provider in a resource provider set. In some embodiments, the transaction matrix may include an amount of total currency spent by the user at each of the resource providers in the transaction matrix. In some embodiments, the transaction matrix may include a binary indicator (e.g., either a 1 or a 0) indicating whether the user has conducted any transactions at the particular resource provider. The information included in the transaction matrix may be limited to only transaction data occurring within a recent time period (e.g., the last three months). Some illustrative examples of transaction matrices are described with respect to FIG. 5 below.

The process 400 may comprise identifying user transaction patterns relative to other users at 406. In some embodiments, user information in the generated transaction matrix may be used to generate a set of coordinates for that user. For example, a user may be assigned coordinates within a multi-dimensional space based on the user's transaction history. In some embodiments, each dimension of the multidimensional space may represent a different resource provider. By way of illustrative example, consider a scenario in which the transaction data 402 includes transaction data from resource providers A, B, and C. In this scenario, a user that has conducted five transactions with Resource provider A, eight transactions with Resource provider B, and one transaction with Resource provider C may be assigned a set of coordinates [5, 8, 1] associated with a three-dimensional space (with each axis associated with one of the three resource providers). In this example, the user's relative location to other users within the space may be used to determine similarities and/or differences in transaction preferences between the users. This is described in more detail with respect to FIG. 6 below.

The process 400 may comprise segmenting users in accordance with the identified relative transaction patterns at 410. In some embodiments, users may be assigned to user segments using clustering techniques. For example, the system may identify a number of centroid locations within a multi-dimensional space. In this example, each user may be clustered to one of the centroids based on that user's relative distance to each centroid. In this way, segments may be created as clusters assigned to various centroids. In this way, each segment may include a number of users assigned relatively similar location coordinates within the multidimensional space. In some embodiments, when determining a user's likelihood of conducting a transaction at a particular resource provider in the future, the system may analyze transaction data for the segment. For example, if 80% of the users in a particular segment conduct transactions at Resource provider A, then the system may determine that a particular user in that segment has an 80% chance of conducting a transaction at Resource provider A. In some cases, this may be determined regardless of the user's actual transaction history. This is described in more detail with respect to FIG. 7 below.

The process 400 may comprise identifying resource providers local to a target resource provider, or within a predetermined distance from the target resource provider. In some embodiments, a resource provider pairing matrix may be generated at 412. The resource provider pairing matrix may be used to store an indication of a time difference transactions conducted at various resource providers by the same user. For example, if User 1 conducts a transaction at Resource provider A at 12:05 pm and subsequently conducts a transaction at Resource provider B at 12:25 pm, then the resource provider pairing matrix may store information related to the difference in time between those two transactions (e.g., 20 minutes) with respect to Resource provider A and Resource provider B. In some embodiments, a stored time difference may represent an average amount of time that transpires between conducted transactions at Resource provider A and Resource provider B. It should be noted that in some cases, transactions occurring over a threshold amount of time apart may not be used. In some embodiments, only the minimum amount of time detected between transactions conducted at two resource providers is recorded. For example, if the current recorded time between transactions for two resource providers is 20 minutes, and new transactions are detected at each of the two resource providers by a single user that are 18 minutes apart, then the current record associated with the two resource providers may be overwritten with 18 minutes.

The process 400 may identify resource providers local to a target resource provider at 414. In some embodiments, a time associated with a pair of resource providers in the resource provider pairing matrix may be assessed to determine whether that time is below a threshold amount of time. For example, if the threshold time is 30 minutes, then all resource providers in the resource provider pairing matrix that are associated with a target resource provider and having a time value less than 30 minutes would be determined to be local, or proximate, to the target resource provider.

In some embodiments, local resource provider data 416 may be compiled upon identifying resource providers local to a target resource provider in process 400, which may include recent transactions conducted with respect to resource providers local to a target resource provider. For example, upon receiving a request for a wait time associated with a particular resource provider (i.e., a target resource provider), the process 400 may identify a number of resource providers local to the particular resource provider. Once identified, the process 400 may identify a number of transactions recently (e.g., within a predetermined period of time) conducted at those local resource providers.

In some embodiments, the process 400 may identify a number of authorization requests originating from a particular resource provider (or a particular point of sale within a resource provider) and may estimate the service rate of that resource provider at 418. In some embodiments, the service rate may be determined based on the identified authorization requests and a mechanism popularity. In this example, the process 400 may determine that X % of consumers utilize a particular payment method associated with the process 400 (the mechanism popularity). For example, the process 400 may determine that 30% of transactions are conducted with cash. Based on the recent authorization requests and the mechanism popularity, the process 400 may extrapolate an estimated service rate. In a simple example, the process 400 may divide the number of authorization requests received for a resource provider over a time period (e.g., the last ten minutes) by the mechanism popularity to estimate a total number of transactions that have likely been conducted during that time period. The total number of transactions may then be divided by the amount of time in the time period to determine a service rate. It should be noted that, in a more complex example, additional transaction factors may be used to increase the accuracy of the service rate estimate. For example, the transaction factors may include historical data that may influence the calculation. In particular, the transaction factors may include an adjustment to be made to the mechanism popularity based on a historical mechanism popularity specific to the resource provider.

By way of illustration, consider the scenario in which the process 400 is performed by VisaNet (a processing network) and has access to all authorization request messages originating from a particular resource provider in which a Visa credit card (or other Visa account) is provided as the payment mechanism. Currently, Visa accounts are used to pay for approximately 52.4% of transactions by consumers (Visa's mechanism popularity). In the above scenario, VisaNet may identify 22 authorization request messages that have been received within the last 10 minutes from Resource provider A. Accordingly, VisaNet may estimate that Resource provider A has likely conducted approximately 42 transactions total (22 transactions divided by 0.524) in the last 10 minutes, for a service rate of 4.2 transactions per minute (42 transactions divided by 10 minutes). It should be noted that any number of factors may influence this estimate. For example, Visa may be the only payment mechanism that the resource provider accepts, meaning that consumers are required to use either Visa or cash. In this example, VisaNet may alter its estimates to take into account the fact that Visa is likely being used in a higher number of transactions than average, which would result in a lower estimated number of total transactions and subsequently a lower service rate.

In some embodiments, a probability distribution may be generated using the information described above at 420. The probability distribution may be generated as output of a regression model, as described elsewhere in this disclosure, by providing the user segment information and/or the local resource provider data as input to the regression model. For example, upon receiving a request for a wait time associated with a target resource provider, a number of local resource providers may be identified. Once this number of local resource providers has been identified, transaction data 402 may be queried to identify transactions conducted at each of those local resource providers within a predetermined time period (e.g., within the last 30 minutes). Users associated with each of these transactions may then be determined from the authorization requests associated with the transactions. User segments associated with each user may be used to determine a probability of that user arriving at the target resource provider (e.g., using the regression model). In some embodiments, users may be filtered out or ignored if a transaction associated with the user indicates that the user has conducted a transaction at a resource provider similar to the target resource provider within a predetermined time period. For example, if the target resource provider is a restaurant, then transactions associated with User A may be ignored upon determining that User A has conducted a transaction at another restaurant within the last hour.

At 422, an expected value may be generated from the probability distribution. For example, a poisson regression may be used to calculate an expected value from the probability distribution. The expected value may represent an estimated arrival rate for the resource provider (e.g., a number of users expected to arrive at the resource provider per a given time unit based on the probability distribution). Once the arrival rate has been estimated, a predicted wait time may be estimated at 424 using the service rate and arrival rate as described above with respect to FIG. 3.

FIG. 5 illustrates example transaction matrices that may be implemented in accordance with embodiments of the disclosure. A transaction matrix may include a record of transactions with respect to users and resource providers. For example, the transaction matrix may include a set of users 502, each of which may be associated with a row or column and a set of resource providers 504, each of which may be associated with a row or column. In some embodiments, the information included in the transaction matrix may be limited to only transaction data occurring within a recent time period (e.g., the last three months).

In some embodiments, users may be associated with a vector (e.g., a set of coordinates) that corresponds to information in the transaction matrix. For example, each user may be associated with the vector comprising the values in the row associated with that user.

In some embodiments, as depicted in transaction matrix 1, a transaction matrix may comprise information pertaining to a number of times 506 that each user in a set of users has conducted a transaction at a particular resource provider. A vector generated from transaction matrix 1 may include the set of values from the row associated with the user. In some embodiments, clustering techniques that use the vector associated with the user may alter a weight assigned to one or more values in the vector. For example, values may be capped at a maximum or minimum value. In some embodiments, outlier values may be winsorized. In some embodiments, as depicted in transaction matrix 2, the transaction matrix may include an amount of total currency 508 spent by each user in the set of users at each of the resource providers in the transaction matrix. In some embodiments, the transaction matrix may include a binary indicator (e.g., either a 1 or a 0) indicating whether the user has conducted any transactions at the particular resource provider. The information included in the transaction matrix may be limited to only transaction data occurring within a recent time period (e.g., the last three months).

Figure 6:
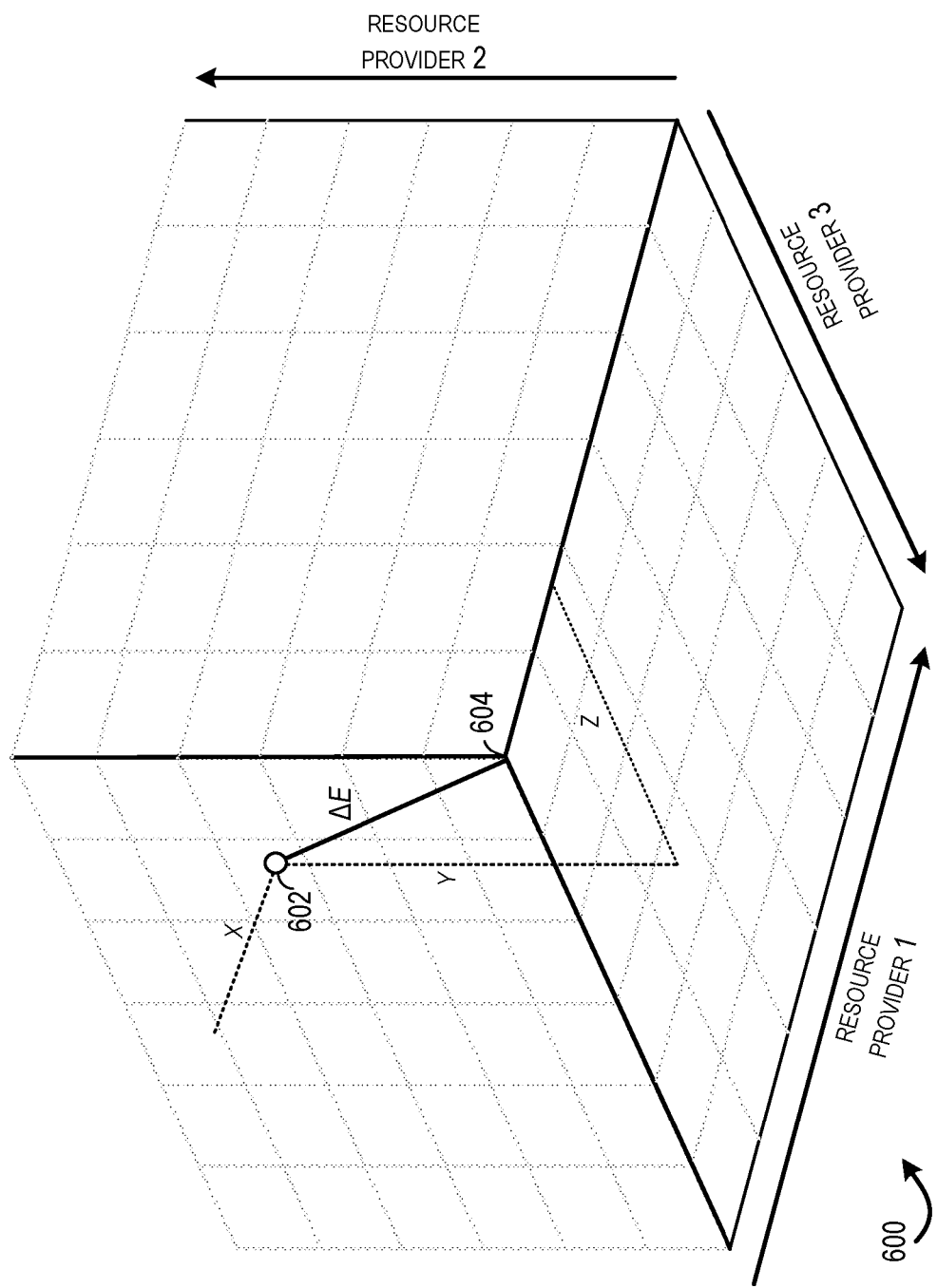
FIG. 6 illustrates an example of generating user coordinates in a multi-dimensional space that may be performed with respect to resource providers in accordance with embodiments of the disclosure.

FIG. 6 illustrates an example of generating user coordinates in a multi-dimensional space that may be performed with respect to resource providers in accordance with embodiments of the disclosure. In FIG. 6, the axes of a multi-dimensional space 600 (represented here as a three-dimensional graph) may comprise resource providers. A user 602 may be positioned with respect to a point of origin 604 within the multi-dimensional space 600 based on a transaction history associated with that user and each of the resource providers comprising the axes. The distance between a user 602 and another point within the multidimensional space (e.g., origin 604) may be referred to as $\Delta E$.

In accordance with at least some embodiments, the multi-dimensional space 600 may be generated by identifying coordinates for, and plotting each user of a transaction matrix in a multi-dimensional space. However, it should be noted that the multi-dimensional space 600 provides a graphical illustration for purposes of explanation, and plotting of users on an actual graph is not necessary for implementation of the disclosure. It should be noted that the described processes can be performed without plotting users in a multi-dimensional space 600.

In accordance with at least some embodiments, the processing network server may calculate the distance between two points within the space. For example, the processing network server may calculate the $\Delta E$ between a user at graph coordinates 602 and point (e.g., a centroid) at graph coordinates 604. In this example, one skilled in the art would readily recognize that a difference in a first resource provider value (represented by x), a difference in a second resource provider value (represented by y), and a difference in a third resource provider value (represented by z) can be used to calculate $\Delta E$. In a simple example, $$\Delta E = \sqrt{x^2 + y^2 + z^2}$$

In accordance with at least some embodiments, a $\Delta E$ may be calculated between a user located at coordinates 404 and each of a plurality of cluster values during execution of a clustering technique. In at least some of these embodiments, a cluster associated with the lowest $\Delta E$ for the user may be assigned to that user. Although a simple formula is presented, $\Delta E$ may be calculated using any distance calculation formula. One skilled in the art would readily recognize that several equivalent techniques are available for calculating a distance between users and/or points.

Figure 7:
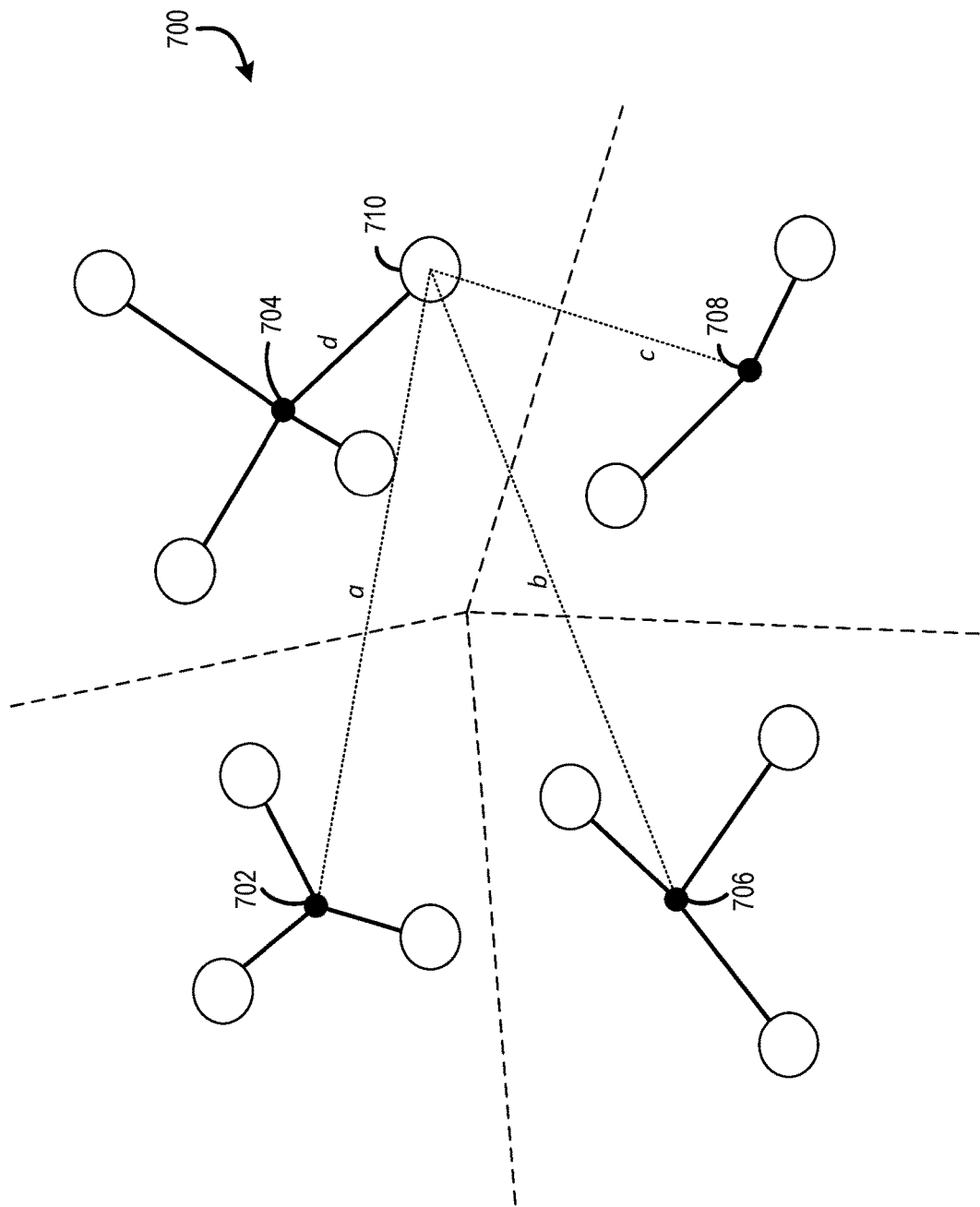
FIG. 7 illustrates an example of a clustering technique that may be used to identify user segments in accordance with embodiments of the disclosure.

FIG. 7 illustrates an example of a clustering technique that may be used to identify user segments in accordance with embodiments of the disclosure. In some embodiments, the clustering technique may be performed with respect to a multi-dimensional space, such as the multidimensional space 600 depicted in FIG. 6. It should be noted that the clustering technique may comprise any suitable technique for grouping users based on similarities. For example, the clustering technique may comprise a k-means clustering technique.

In a user clustering model 700, several users are depicted as belonging to various cluster points (or centroids) 702, 704, 706, and 708. In accordance with at least some embodiments, cluster points 702, 704, 706, and 708 are sets of coordinates in a multi-dimensional resource provider space. Each of the plurality of users is assigned to the cluster point with the lowest $\Delta E$ between the user space coordinates of the cluster point and user space coordinates associated with the user. For example, upon calculating distances a, b, c, and d between a user 710 and various centroids 702, 704, 706, and 708, it may be determined that d represents the shortest distance. Accordingly, user 710 would be assigned to centroid 704.

In accordance with at least some embodiments, user cluster data from user clustering model 700 may be stored and/or maintained. For example, cluster data may be stored in user segment data, which may be an example of user segment data 410 of FIG. 4. In at least some embodiments, user segment data may include information related to the user, such as an user identifier, user name, user category, the determined user coordinates, or any other appropriate user-related information. In accordance with at least some embodiments, a list of users may be maintained in relation to each cluster.

In accordance with embodiments of the disclosure, one or more attributes of users of the cluster may be imparted to individual users within the cluster. For example, it may be determined that 90% of users within a particular cluster conduct transactions at a particular resource provider. In this example, a particular user within that segment may be assigned a probability of conducting a future transaction at that particular resource provider based on the determined 90% even if the particular user has never actually conducted a transaction at that particular resource provider. In some embodiments, an average transaction amount and/or an average number of transactions conducted by users in the cluster may be imparted to a particular user in the cluster. Once a user has been assigned to a cluster, a probability may be determined for each user in the cluster by using cluster data as input in a regression model as described elsewhere in the disclosure.

In some embodiments, users are clustered using only recent transaction data. It should be noted that because user transaction preferences may change over time, this enables the system to dynamically update user segments as those transaction preferences change. In some embodiments, user segment data may be generated independent of the described process. For example, user segment data may be generated on a periodic basis (e.g., monthly, daily, hourly, etc.). In this example, a request for a wait time may use the most recently generated segment data.

Figure 8:
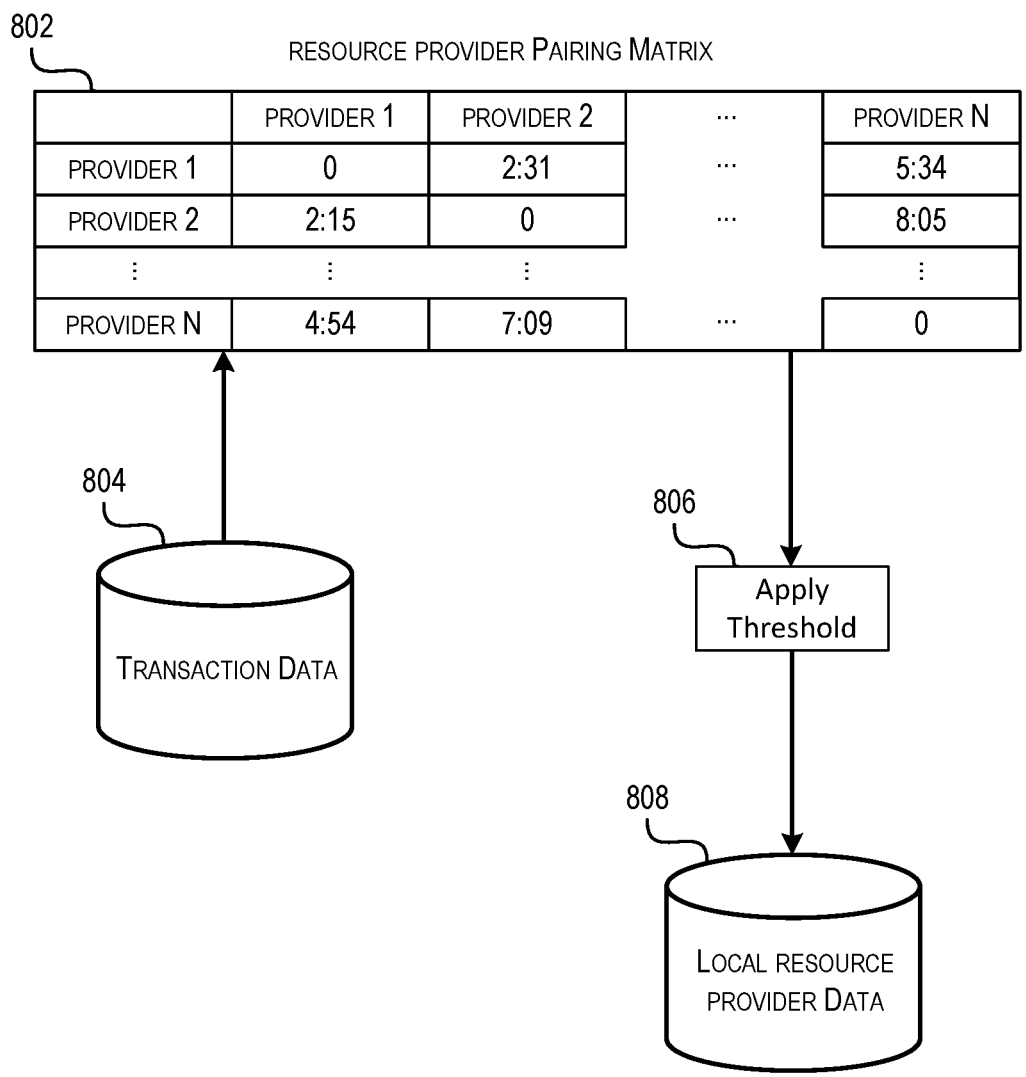
FIG. 8 illustrates a process for identifying resource providers local to a target resource provider using transaction data.

FIG. 8 illustrates a process for identifying resource providers local to a target resource provider using transaction data. In order to do this, the process 800 may comprise the generation of a resource provider pairing matrix 802 as described below. Once the resource provider pairing matrix 802 has been generated and populated with time information, it may be used to identify a set of resource providers local to a target resource provider by filtering the resource providers in the resource provider pairing matrix according to their respective time difference compared to a threshold value.

In some embodiments, a resource provider pairing matrix 802 may be generated from transaction data 804. The resource provider pairing matrix may be used to store an indication of a time difference in transactions conducted at various resource providers by the same user. For example, if User 1 conducts a first transaction at Resource provider A and subsequently conducts a second transaction at Resource provider B, then the resource provider pairing matrix may store information related to the difference in time between those two transactions in a field associated with both Resource provider A and Resource provider B. In some embodiments, the order in which the transactions are conducted may matter. For example, the rows of the resource provider pairing matrix 802 may represent the resource provider associated with the first transaction and the columns of the resource provider pairing matrix 802 may represent the resource provider associated with the second transaction. In this example, each pair of resource providers may be associated with two different time differences, one which represents the difference in time between transactions conducted at Resource provider A and then Resource provider B, and one which represents the difference in time between transactions conducted at Resource provider B and then Resource provider A.

In some embodiments, a stored time difference may represent an average amount of time that transpires between conducted transactions at Resource provider A and Resource provider B. It should be noted that in some cases, transactions occurring over a threshold amount of time apart may not be used. For example, the system may only use transactions occurring within the same 24 hour period. In some embodiments, only the minimum amount of time detected between transactions conducted at two resource providers is recorded in order to represent the actual distance (in time) between the resource provider locations. For example, if the current recorded time between transactions for two resource providers is 20 minutes, and new transactions are detected at each of the two resource providers by a single user that are 18 minutes apart, then the current record associated with the two resource providers may be overwritten with 18 minutes as it is determined that a user could make the trip in 18 minutes. Additionally, the recorded time may be transitive. For example, if User 1 conducts a transaction at Resource provider A at 12:34 followed by a subsequent transaction at Resource provider B at 12:58, then the resource provider pairing matrix 802 may be updated to reflect the 24 minute difference between Resource provider A and Resource provider B. If a User 2 conducts a transaction at Resource provider B at 12:43 followed by a subsequent transaction at Resource provider C at 12:59, then the resource provider pairing matrix 802 may be updated to reflect the 16 minute difference between the Resource provider B and Resource provider C. In this example, the resource provider pairing matrix 802 may also be updated to reflect a 40 minute difference between Resource provider A and Resource provider C based on the separately detected transactions.

Upon receiving a request for a wait time at a particular resource provider, resource providers local to a target resource provider may be determined. In some embodiments, a time associated with a pair of resource providers in the resource provider pairing matrix may be assessed to determine whether that time is below a threshold amount of time at 806. For example, if the threshold time is 30 minutes, then all resource providers in the resource provider pairing matrix that are associated with a target resource provider and having a time value less than 30 minutes would be determined to be local, or proximate, to the target resource provider. In some embodiments, each of the identified local resource providers may be added to a database table storing local resource provider data 808 for the target resource provider. Once compiled, local resource provider data 808 may be used to determine an arrival rate for the target resource provider. To do this, the system may query transaction data 804 for recent transactions conducted at the resource providers identified in local resource provider data

808. The system is then able to identify users that may potentially arrive at the target resource provider as users that recently conducted transactions at the local resource providers. It should be noted that process 800 represents one method of identifying resource providers local to a target resource provider. It should be noted that one skilled in the art could implement an equivalent process to determine a set of resource providers local to the target resource provider. For example, in some embodiments, address information associated with each resource provider may be used to determine a set of local resource providers.

Figure 9:
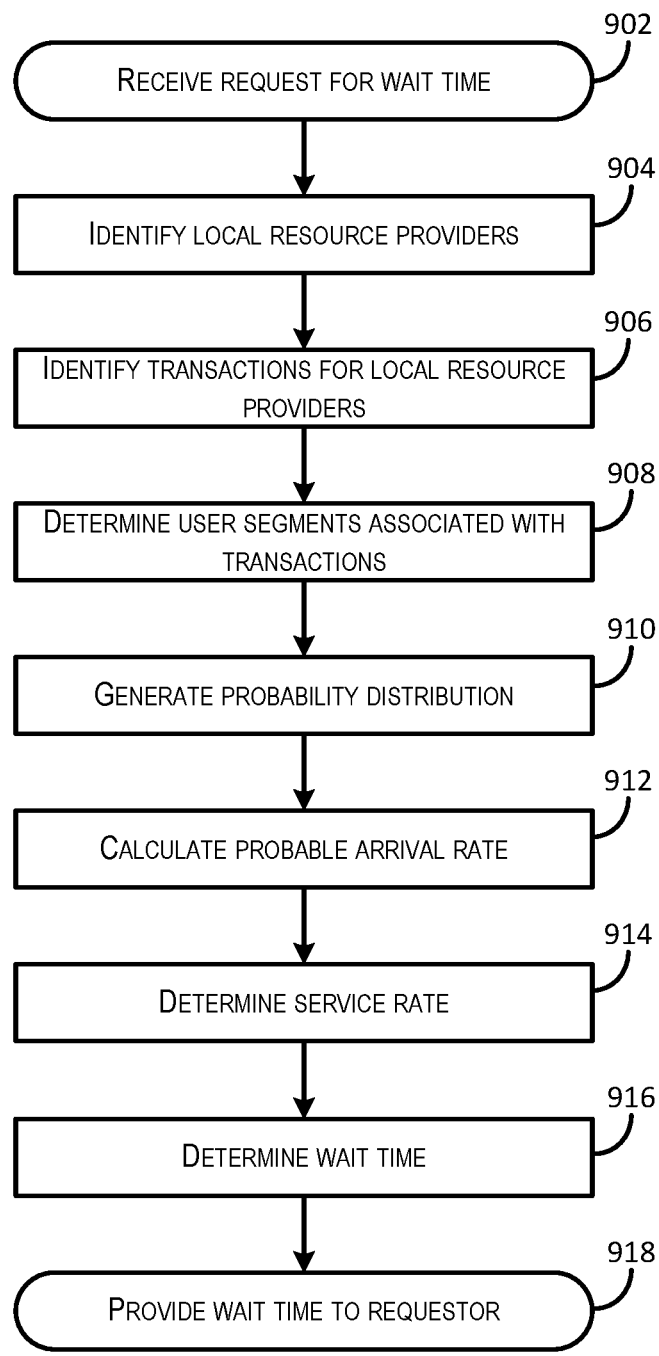
FIG. 9 depicts a flow diagram illustrating a process for generating wait times in accordance with embodiments of the disclosure.

FIG. 9 depicts a flow diagram illustrating a process for generating wait times in accordance with embodiments of the disclosure. In some embodiments, process 900 may begin at 902, when a processing network server receives a request for a wait time associated with a target resource provider (e.g., a particular resource provider with respect to which the analysis should be performed). In some embodiments, the request may be received from a mobile application installed on, and executed from, a mobile device in communication with either the processing network server or a mobile application server in communication with the processing network server. In some embodiments, a user of the mobile device may select a target resource provider (e.g., from a list of available resource providers). In some embodiments, a number of target resource providers may be selected automatically based on a geographic location of the mobile device.

At 904, the processing network server may identify a number of resource providers that are local to the target resource provider. In some embodiments, this may be done using process 800 described above with respect to FIG. 8, wherein a resource provider pairing matrix is generated and resource providers are identified that are within a predetermined time distance of the target resource provider. In some embodiments, this may be done based on geographic location. For example, the processing network server may identify local resource providers based on geographic location information.

At 906, the processing network server may identify recent transactions conducted at each of the identified local resource providers. For example, the processing network server may query transaction data to identify transactions conducted at each of the local resource providers within the last 30 minutes. In some embodiments, the processing network server may store this information in one or more sets of data. For example, in some embodiments, all of the identified transactions may be stored within a single set of transactions. In a second example, transactions may be stored in a number of different transaction sets, each of which is associated with a different time period, based on the time distance between the target resource provider and the local resource provider and the amount of time that has elapsed since the recent transaction. By way of illustration, the processing network server may be configured to identify all transactions occurring within the last 30 minutes at each of the local resource providers and store those transactions in three separate sets of transaction information so that three separate arrival rates may be estimated. In this example, the processing network server may identify a transaction that was conducted at Resource provider B 14 minutes ago. The processing network server may determine that the time distance between Resource provider B and the target resource provider is 20 minutes. Based on this analysis, the processing network server may determine that this particular transaction should be used to assess an arrival rate at the target resource provider six minutes from now. In some embodiments, the processing network server may estimate a probability that the user associated with the transaction in the above example will arrive at the target resource provider in a number of different time periods.

At 908, the processing network server may identify users associated with each of the identified recent transactions and a user segment for each of those users. In some embodiments, user segment data may be generated independent of the described process 900. For example, user segment data may be generated in accordance with embodiments of the disclosure on a periodic basis (e.g., monthly, daily, hourly, etc.). Once a relevant transaction is identified at 906, the processing network server may query the transaction data to identify the user associated with that transaction. The user segment information may then be queried to identify the user segment (or segments) associated with the user. In some embodiments, attributes of the segment that the user is associated with are imparted to the user during the analysis.

At 910, the processing network server may generate a probability distribution based on the identified users. In some embodiments, information associated with each of the recent transactions (e.g., the time of the recent transaction, the time difference between the resource providers, an amount of the transaction, etc.) and information associated with the user (e.g., the user's tendency to shop at the target resource provider, the segment's tendency to shop at the target resource provider, etc.) may be provided as inputs to a regression model. In response, the regression model may output a probability distribution that represents a probability that each of the users in the identified transactions will conduct a transaction at the target resource provider.

At 912, the processing network server may calculate a probable arrival rate. In some embodiments, the arrival rate may be calculated as an expected value from the output probability distribution using a regression technique. The regression technique used may be either linear or non-linear. For example a poisson regression technique may be used to calculate an expected values from the probability distribution. This expected value may correspond to a predicted arrival rate for the target resource provider.

At 914, the processing network server may determine a service rate for the target resource provider. For example, the service rate may be determined as a number of transactions conducted by the target resource provider over a period of time (e.g., transactions per minute). In some embodiments, only target-resource provider-specific data pertaining to recent transactions may be used to calculate the service rate. For example, a current service rate may be calculated using only transaction data from the target resource provider received in the last five minutes.

At 916, the processing network server may estimate a wait time for the target resource provider. The wait time may be estimated by calculating a previous wait time+the estimated arrival rate−the calculated service rate. In this formula, the arrival rate represents the number of people predicted to arrive in a given time period and the service rate represents the number of people that will be serviced (i.e., leave) in that same given time period. Accordingly, the estimated arrival rate minus the calculated service rate represents the change in wait time that will occur over the given time period. In some embodiments, the previous wait time may be calculated based on historical transaction data. For example, the processing network server may calculate a number of transactions that have historically been conducted in the past at the target resource provider around the given time period.

At 918, the processing network server may provide the estimated wait time to the requestor. In some embodiments, the estimated wait time may be provided to a mobile application installed on, and executed from, a mobile device. In some embodiments, the processing network server may be configured to receive feedback from a user of the mobile device as to the actual experienced wait time. In at least some of these embodiments, the processing network server may be configured to adjust one or more variables used in the calculation of future wait times based on the received feedback. In some embodiments, the processing network server may be configured to determine a distance that the user is from the target resource provider. Based on this determined distance, the processing network server may be configured to determine a time at which the user will likely arrive at the resource provider and a wait time estimate for that arrival time.

Embodiments of the invention provide several technical advantages. For example, typical systems may have access to only information provided by a single resource provider or those resource providers that participate in the system, which may not be sufficient to provide comprehensive wait time predictions across multiple resource providers. However, the present invention comprises a system that uses transaction data collected from multiple resource providers. Accordingly, this system can enable access to real-time transaction data (data related to transactions conducted within a predetermined period of time) along with other dynamic and static data, in order to ensure predictions of wait times and other relevant information that are more timely and accurate and span multiple resource providers. In addition, in embodiments which rely on authorization request data provided to a payment processing network, this disclosure requires no data from the resource provider itself. This means that, unlike other systems in which data must be obtained from a resource provider itself, the disclosed system comprises one in which the resource provider need not be an active participant, ensuring that the predicted wait times remain unbiased.

A computer system may be used to implement any of the entities or components described above. The subsystems used to implement the disclosure may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of determining a queue time for a target resource provider comprising:
   determining, based on historical consecutive transactions, a set of resource providers in a vicinity of the target resource provider, wherein an individual resource provider of the set of resource providers is determined to be in the vicinity of the target resource provider when historical consecutive transactions associated with both the individual resource provider and the target resource provider occur within a threshold time frame;

identifying a plurality of transactions received from the set of resource providers in the vicinity of the target resource provider;

determining a plurality of users associated with the plurality of transactions;

determining, for each of the plurality of users, a user segment of which the user belongs;

determining, for each transaction in the plurality of transactions based on the user segment of the user associated with that transaction, a probability of a pending transaction at the target resource provider;

determining, based on the determined probabilities, a probability distribution representing a number of probabilities for transactions at the target resource provider;

calculating, from the probability distribution, a likely total pending transactions at the target resource provider;

determining, based on transactions associated with the target resource provider, a service rate for the target resource provider; and calculating, by dividing the likely total pending transactions at the target resource provider by the service rate, the queue time for the target resource provider.

2. The method of claim 1, wherein the user segments associated with each of the plurality of users associated with the plurality of transactions is determined using one or more clustering techniques.

3. The method of claim 2, wherein the one or more clustering techniques comprises clustering the plurality of users associated with the plurality of transactions based on each user's transaction history.

4. The method of claim 2, wherein the one or more clustering techniques comprises use of a k-means clustering algorithm.

5. The method of claim 1, wherein the likely total pending transactions at the target resource provider is determined using at least one regression technique.

6. The method of claim 1, wherein the at least one regression technique comprises a poisson regression.

7. The method of claim 1, wherein the likely total pending transactions are communicated to the target resource provider.

8. A server apparatus comprising:
one or more processors; and
a memory including instructions that, when executed by the one or more processors, cause the server apparatus to:

determine, based on historical consecutive transactions, a set of resource providers in a vicinity of the target resource provider, wherein an individual resource provider of the set of resource providers is determined to be in the vicinity of the target resource provider when historical consecutive transactions associated with both the individual resource provider and the target resource provider occur within a threshold time frame;

identify a plurality of transactions received from the set of resource providers in the vicinity of the target resource provider;

determine a plurality of users associated with the plurality of transactions;

determine, for each of the plurality of users, a user segment to which the user belongs;

determine, for each transaction in the plurality of transactions based on the user segment of the user associated with that transaction, a probability of a pending transaction at the target resource provider;

determine, based on the determined probabilities, a probability distribution representing a number of probabilities for transactions at the target resource provider;

calculate, from the probability distribution, a likely total pending transactions at the target resource provider;

determine, based on transactions associated with the target resource provider, a service rate for the target resource provider; and calculate, by dividing the likely total pending transactions at the target resource provider by the service rate, the queue time for the target resource provider.

9. The server apparatus of claim 8, wherein determining, for each of the plurality of users, a user segment to which the user belongs:

generating a transaction matrix comprising relationship information associated with transactions conducted between a plurality of users at a plurality of resource providers; and grouping users into segments based on similarities in the relationship information.

10. The server apparatus of claim 9, wherein the instructions further cause the server apparatus to associate each user with a vector corresponding to the relationship information.

11. The server apparatus of claim 10, wherein the users are clustered into the segments based on the vectors associated with the users.

* * * * *